United States Patent
Hwang et al.

(10) Patent No.: US 10,791,263 B1
(45) Date of Patent: Sep. 29, 2020

(54) CAMERA AUXILIARY DEVICE FOR PRIVACY PROTECTION AND PRIVACY PROTECTION METHOD USING THE SAME

(71) Applicant: ELECTRONICS AND TELECOMMUNICATIONS RESEARCH INSTITUTE, Daejeon (KR)

(72) Inventors: Bon-Woo Hwang, Daejeon (KR); Ki-Nam Kim, Daejeon (KR); Tae-Joon Kim, Sejong-si (KR); Seung-Uk Yoon, Daejeon (KR); Seung-Wook Lee, Daejeon (KR); Seong-Jae Lim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 16/776,720

(22) Filed: Jan. 30, 2020

(30) Foreign Application Priority Data

Oct. 8, 2019 (KR) .................... 10-2019-0124387

(51) Int. Cl.
*G06T 11/00* (2006.01)
*H04N 5/232* (2006.01)
*G06F 21/62* (2013.01)

(52) U.S. Cl.
CPC ..... *H04N 5/23219* (2013.01); *G06F 21/6245* (2013.01); *H04N 5/23222* (2013.01)

(58) Field of Classification Search
CPC ............ H04N 5/23219; H04N 5/23222; G06F 21/6245
USPC .......................................................... 348/169
See application file for complete search history.

(56) References Cited

U.S. PATENT DOCUMENTS

| 8,666,110 B2 | 3/2014 | Yoo et al. |
| 10,008,240 B2 | 6/2018 | Koide et al. |
| 2013/0108105 A1 | 5/2013 | Yoo et al. |
| 2014/0085463 A1 | 3/2014 | Kwon |
| 2017/0256086 A1* | 9/2017 | Park .......................... G06T 7/73 |
| 2018/0025175 A1* | 1/2018 | Kato .................... G06F 21/6254 713/153 |

FOREIGN PATENT DOCUMENTS

| JP | 2016-208127 A | 12/2016 |
| KR | 10-2014-0041206 A | 4/2014 |
| KR | 10-1911900 B1 | 10/2018 |

* cited by examiner

*Primary Examiner* — Nguyen T Truong
(74) *Attorney, Agent, or Firm* — LRK Patent Law Firm

(57) ABSTRACT

A camera auxiliary device for privacy protection and a privacy protection method using the camera auxiliary device. The camera auxiliary device for privacy protection includes a processor for splitting an input light beam that is reflected from a capturing target into a first input beam for detecting a privacy protection area and a second input beam to be transferred to a camera connected to a user terminal, detecting a privacy protection area in an image signal generated based on the first input beam, and converting the second input beam and then transferring a converted second input beam to the camera so that personal information included in the privacy protection area is not visually identified, and a memory for storing the image signal and the privacy protection area.

10 Claims, 6 Drawing Sheets

CAMERA AUXILIARY DEVICE FOR PRIVACY PROTECTION AND PRIVACY PROTECTION METHOD USING THE SAME

CROSS REFERENCE TO RELATED APPLICATION

This application claims the benefit of Korean Patent Application No. 10-2019-0124387, filed Oct. 8, 2019, which is hereby incorporated by reference in its entirety into this application.

BACKGROUND OF THE INVENTION

1. Technical Field

The present invention relates generally to technology that is capable of protecting the privacy of each person through an auxiliary device additionally installed on an existing camera, and more particularly, to technology that is capable of preventing the leakage of personal privacy by converting a portion, which contains personal information, in an input light beam transferred to a camera and providing the resulting information.

2. Description of Related Art

In applications that take pictures and perform digital image processing on the pictures, technology for identifying and managing personal (privacy) information such as faces is very important. In particular, in the case where personal information is identified and managed in special purposes such as medical fields, such technology may be a more important issue.

In existing technology, methods of preventing personal information from being stored or of pixelating important information through image processing have been used by processing personal information over secure networks. However, even in this case, each user could not reliably use existing secure services due to the anxiety that his or her personal information might be stored.

PRIOR ART DOCUMENTS

Patent Documents (Patent Document 1) Korean Patent Application Publication No. 10-2014-0041206, Date of Publication: Apr. 4, 2014 (Title: Camera and Camera Controlling Method for Generating Privacy Mask)

SUMMARY OF THE INVENTION

Accordingly, the present invention has been made keeping in mind the above problems occurring in the prior art, and an object of the present invention is to fundamentally protect personal information so that the personal information is not transferred to a camera from a time point at which an image is captured by attaching a physical auxiliary device to the camera and capturing the image using the camera.

Another object of the present invention is to provide highly-reliable privacy protection technology that allows a user to personally check protected information by providing a camera auxiliary device for privacy protection, which is merely optically and physically connected, without being entirely connected to an external network, a camera, a mobile terminal, etc.

A further object of the present invention is to provide privacy protection technology that reduces influence on various applications such as somatometry and three-dimensional (3D) avatar reconstruction, compared to existing privacy protection technology, when applying images captured by an external camera to the applications.

In accordance with an aspect of the present invention to accomplish the above objects, there is provided a camera auxiliary device for privacy protection, including a processor for splitting an input light beam that is reflected from a capturing target into a first input beam for detecting a privacy protection area and a second input beam to be transferred to a camera connected to a user terminal, detecting a privacy protection area in an image signal generated based on the first input beam, and converting the second input beam and then transferring a converted second input beam to the camera so that personal information included in the privacy protection area is not visually identified; and a memory for storing the image signal and the privacy protection area.

The processor may convert the second input beam so that a portion of the second input beam corresponding to the privacy protection area is replaced with at least one of a masking image, a low-resolution image, and an image configured using an arbitrary object.

The processor may convert the first input beam into an electrical signal by transferring the first input beam to a sensor based on an internal lens, and may generate the image signal by controlling at least one of a gain, brightness, contrast, color balance, definition, and sensor noise of the electrical signal.

The processor may adjust at least one of an image size and an image location so that the image signal matches an image generated based on the second input beam.

The masking image may be an image that is processed not to be identifiable by encrypting or masking a portion corresponding to the personal information, the low-resolution image may be an image, a quality of which is deteriorated to such an extent that the image is not visually identifiable by pixelating and blurring the portion corresponding to the personal information, and the image configured using the arbitrary object may be an image represented by replacing the portion corresponding to personal information with an avatar or a component corresponding to the arbitrary object.

In accordance with another aspect of the present invention to accomplish the above objects, there is provided a privacy protection method using a camera auxiliary device attached to an external lens part of a camera, including splitting, by a camera auxiliary device for privacy protection, an input light beam that is reflected from a capturing target into a first input beam for detecting a privacy protection area and a second input beam to be transferred to the camera connected to a user terminal; detecting, by the camera auxiliary device, the privacy protection area in an image signal generated based on the first input beam; and converting, by the camera auxiliary device, the second input beam and transferring a converted second input beam to the camera so that personal information included in the privacy protection area is not visually identified, wherein the camera auxiliary device is physically attached to the external lens part of the camera without being connected to the user terminal, the camera, and an external network.

Transferring the converted second input beam may include converting the second input beam so that a portion of the second input beam corresponding to the privacy protection area is replaced with at least one of a masking image, a low-resolution image, and an image configured using an arbitrary object.

Detecting the privacy protection area may include converting the first input beam into an electrical signal by transferring the first input beam to a sensor based on an internal lens; and generating the image signal by controlling at least one of a gain, brightness, contrast, color balance, definition, and sensor noise of the electrical signal.

Generating the image signal may include adjusting at least one of an image size and an image location so that the image signal matches an image generated based on the second input beam.

The masking image may be an image that is processed not to be identifiable by encrypting or masking a portion corresponding to the personal information, the low-resolution image may be an image, a quality of which is deteriorated to such an extent that the image is not visually identifiable by pixelating and blurring the portion corresponding to the personal information, and the image configured using the arbitrary object may be an image represented by replacing the portion corresponding to personal information with an avatar or a component corresponding to the arbitrary object.

BRIEF DESCRIPTION OF THE DRAWINGS

The above and other objects, features and advantages of the present invention will be more clearly understood from the following detailed description taken in conjunction with the accompanying drawings, in which.

DESCRIPTION OF THE PREFERRED EMBODIMENTS

Figure 1:
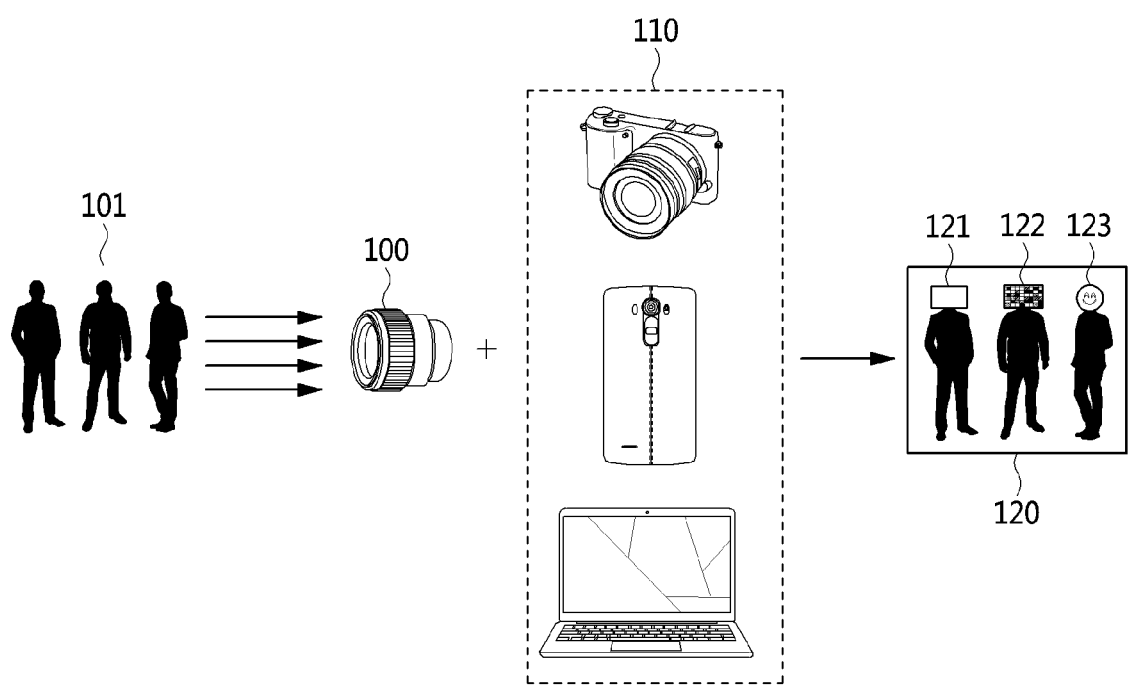
FIG. 1 is a diagram illustrating a privacy protection system using a camera auxiliary device according to an embodiment of the present invention.

The present invention will be described in detail below with reference to the accompanying drawings. Repeated descriptions and descriptions of known functions and configurations which have been deemed to make the gist of the present invention unnecessarily obscure will be omitted below. The embodiments of the present invention are intended to fully describe the present invention to a person having ordinary knowledge in the art to which the present invention pertains. Accordingly, the shapes, sizes, etc. of components in the drawings may be exaggerated to make the description clearer.

Hereinafter, preferred embodiments of the present invention will be described in detail with reference to the attached drawings.

FIG. 1 is a diagram illustrating a privacy protection system using a camera auxiliary device according to an embodiment of the present invention.

Referring to FIG. 1, the privacy protection system using a camera auxiliary device according to the embodiment of the present invention includes a camera auxiliary device 100 and a user terminal 110 having a camera for capturing an image of a capturing target.

First, the camera auxiliary device 100 for privacy protection, which is attached to an external lens part of the camera connected to the user terminal 110, splits an input light beam, which is reflected from a capturing target 101, into a first input beam for detecting a privacy protection area and a second input beam to be transferred to the camera.

The camera auxiliary device 100 may be physically attached to the external lens part of the camera without being connected to the user terminal 110, the camera, and an external network.

Then, the camera auxiliary device 100 may detect the privacy protection area in an image signal generated based on the first input beam.

Here, the first input beam may be transferred to a sensor based on an internal lens, and may then be converted into an electrical signal.

Here, the image signal may be generated by controlling at least one of a gain, brightness, contrast, color balance, definition, and sensor noise of the electrical signal.

In this case, at least one of an image size and an image location may be adjusted such that the image signal matches an image based on the second input beam.

Thereafter, the camera auxiliary device 100 converts the second input beam and transfers the converted input beam to the camera provided in the user terminal 110 so that the personal information contained in the privacy protection area is not visually identified.

Here, the second input beam may be converted such that a portion of the second input beam corresponding to the privacy protection area is replaced with at least one of a masking image 121, a low-resolution image 122, and an image 123 configured using an arbitrary object.

Here, the masking image 121 may be an image processed not to be identifiable by encrypting or masking a portion corresponding to personal information. The low-resolution image 122 may be an image, the quality of which is deteriorated to such an extent that the portion corresponding to the personal information is not visually identifiable by pixelating and blurring the corresponding portion. The image 123 configured using the arbitrary object may be an image represented by replacing the portion corresponding to the personal information with an avatar or a component corresponding to the arbitrary object.

Therefore, the user terminal 110 may display a privacy-protected image 120 to the user based on the image signal corresponding to the converted second input beam.

By means of the above-described processing, a still image or a moving image (video) may be provided in the form of the privacy-protected image 120 in semi-real time or real time. In this case, the configuration of the present invention is not limited by the processing speed of the process for providing the privacy-protected image 120.

Also, the camera auxiliary device 100 is not limited to the form of FIG. 1, and may be configured in various forms attachable to the camera of the user terminal 110.

Figure 2:
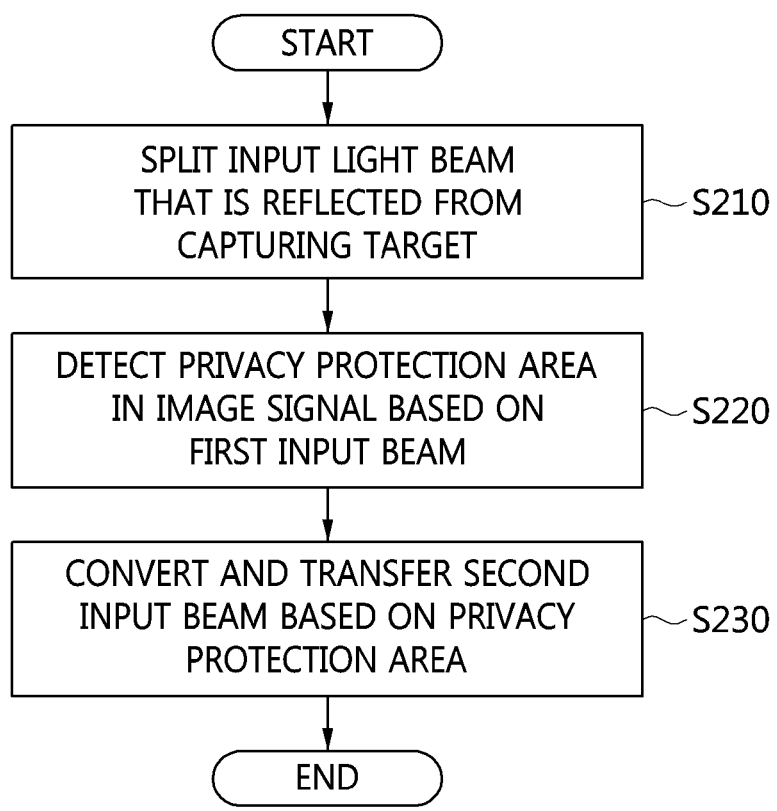
FIG. 2 is an operation flowchart illustrating a privacy protection method using a camera auxiliary device according to an embodiment of the present invention.

FIG. 2 is an operation flowchart illustrating a privacy protection method using a camera auxiliary device according to an embodiment of the present invention.

Referring to FIG. 2, in the privacy protection method using the camera auxiliary device according to the embodiment of the present invention, the camera auxiliary device for privacy protection, which is attached to an external lens part of the camera connected to a user terminal, splits an input light beam, which is reflected from a capturing target, into a first input beam for detecting a privacy protection area and a second input beam to be transferred to the camera at step S210.

Here, the camera auxiliary device may be physically attached to the external lens part of the camera without being connected to the user terminal, the camera, and the external network.

Figure 3:
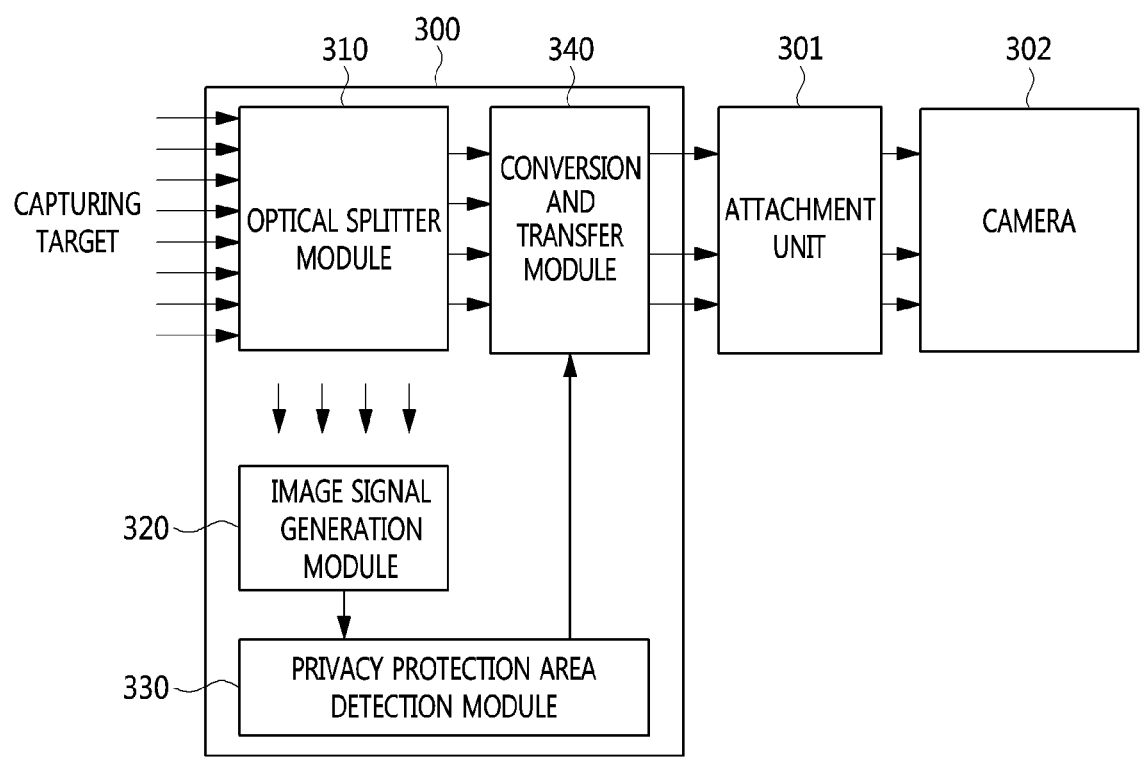
FIG. 3 is a block diagram illustrating the detailed structure of a camera auxiliary device according to an embodiment of the present invention.

For example, referring to FIG. 3, a camera auxiliary device 300 according to an embodiment of the present invention may be operated, with the camera auxiliary device 300 being attached to an attachment unit 301 of a camera 302 provided on the user terminal. The camera auxiliary device 300 attached to the camera 302 in this way may split an input light beam, which is reflected from a capturing target, into a first input beam and a second input beam based on an optical splitter module 310, which splits the input light beam into the first input beam and the second input beam.

Figure 4:
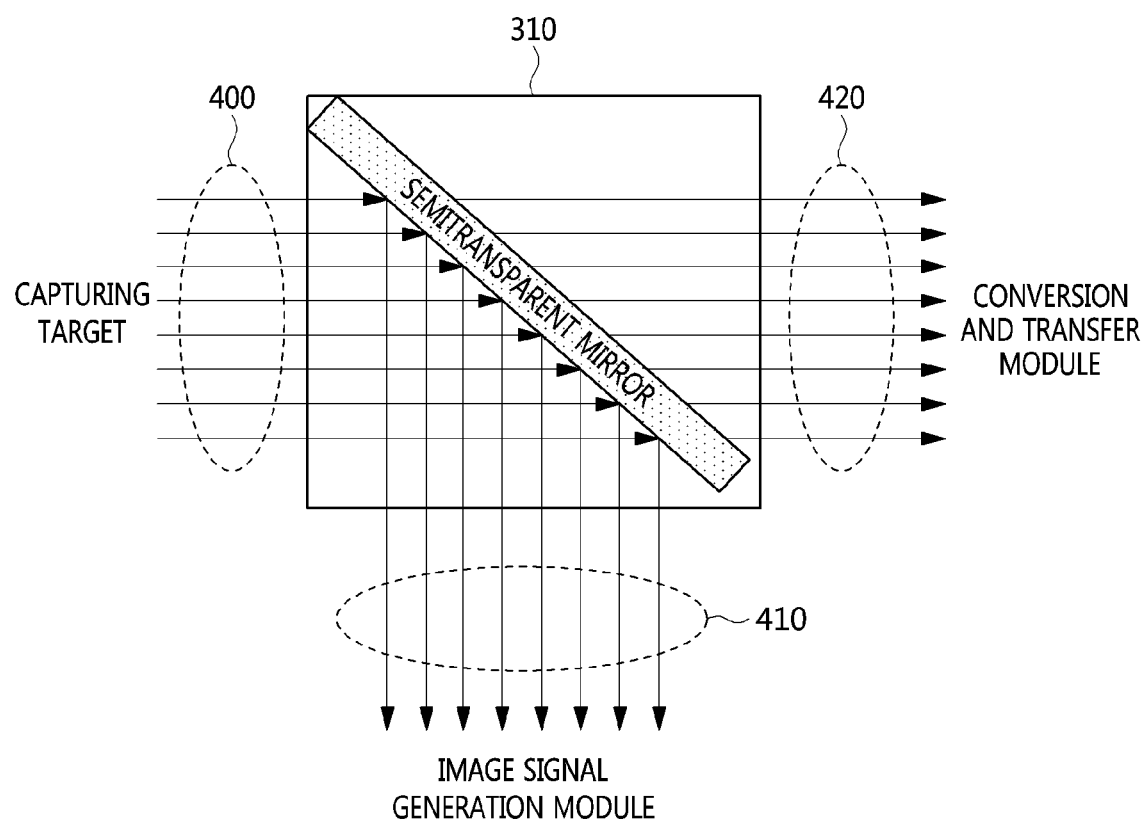
FIG. 4 is a diagram illustrating in detail the optical splitter module illustrated in FIG. 3.

For example, referring to FIG. 4, the optical splitter module 310 may split an input light beam 400, which is reflected from a capturing target, into a first input beam 410 and a second input beam 420 using a semitransparent mirror provided in the optical splitter module. In this way, the input light beam 400 is split into the first input beam 410 and the second input beam 420, thus enabling the image signal generation module 320 and the camera 302 illustrated in FIG. 3 to capture images at the time point synchronized with the image signal generation module 320 and the camera 302.

Further, in the privacy protection method using the camera auxiliary device according to an embodiment of the present invention, the camera auxiliary device detects a privacy protection area in the image signal generated based on the first input beam at step S220.

For example, referring to FIG. 3, the image signal generation module 320 may convert the first input beam, which is received from the optical splitter module 310, into an image signal, and may output the image signal.

Figure 5:
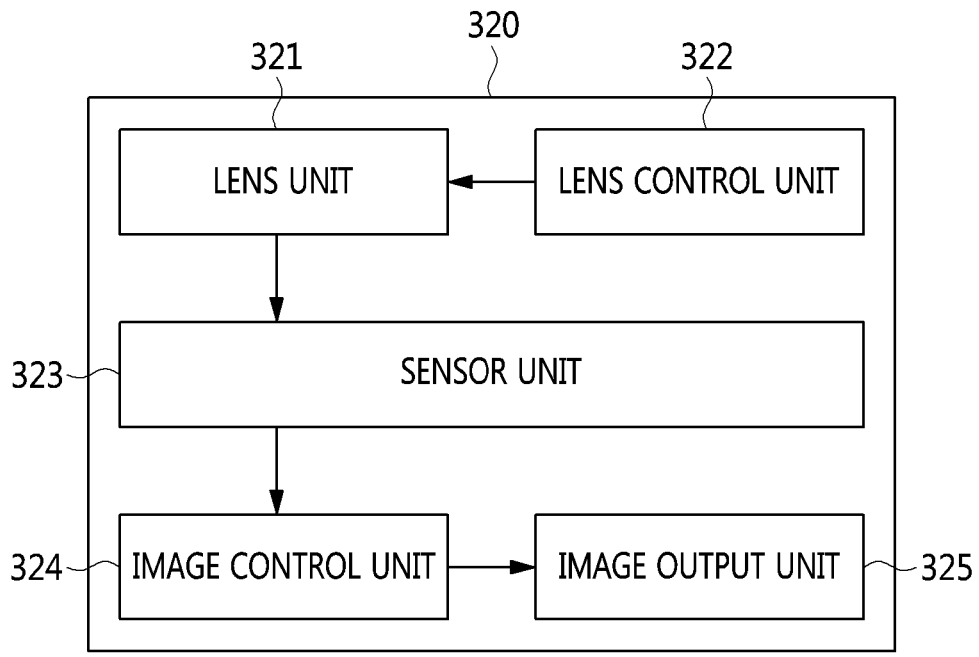
FIG. 5 is a block diagram illustrating in detail the image signal generation module illustrated in FIG. 3.

Referring to FIG. 5, the image signal generation module 320 may include a lens unit 321, which focuses the first input beam received from the optical splitter module 310 on a sensor, a lens control unit 322 for controlling the focal point of the internal lens of the lens unit 321, the enlargement magnification of the lens unit, the vertical/horizontal deviations of the lens unit, etc., a sensor unit 323 for converting an optical signal corresponding to the first input beam into an electrical signal, an image control unit 324, and an image output unit 325 for converting the image signal into a signal suitable for external output, and outputting the converted signal.

Here, the first input beam may be transferred to the sensor of the sensor unit 323 based on an internal lens of the lens unit 321, and may then be converted into the electrical signal. The image control unit 324 may control at least one of the gain, brightness, contrast, color balance, definition, and sensor noise of the electrical signal corresponding to the image signal converted by the sensor unit 323.

Figure 6:
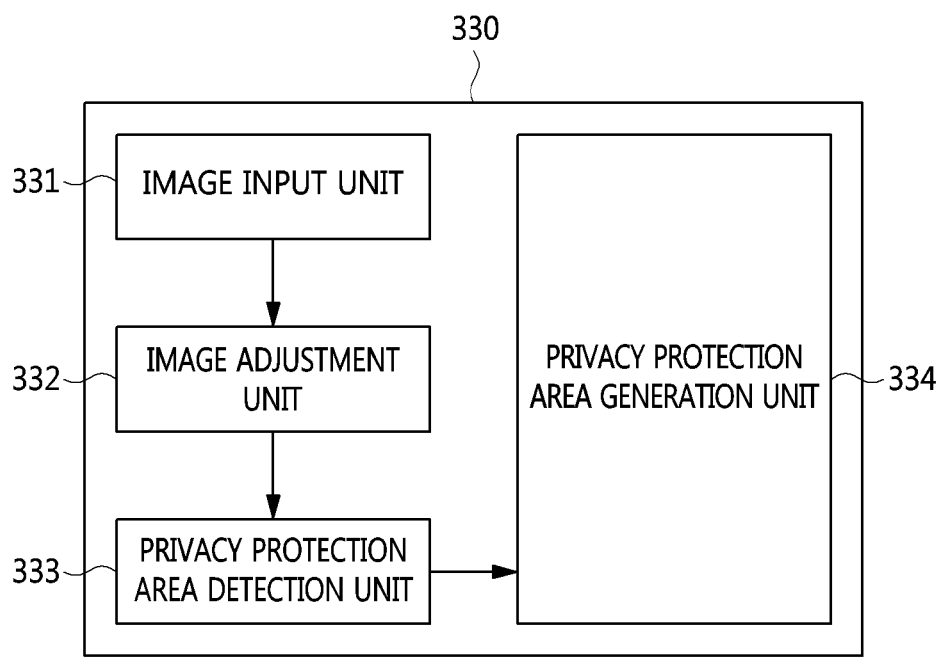
FIG. 6 is a block diagram illustrating in detail the privacy protection area detection module illustrated in FIG. 3.

Further, referring to FIG. 6, a privacy protection area detection module 330 may include an image input unit 331 for receiving an image signal from the image signal generation module 320 illustrated in FIG. 3, an image adjustment unit 332 for adjusting the image signal so that the image signal received from the image signal generation module 320 matches an image generated based on the second input beam, a privacy protection area detection unit 333 for detecting an area requiring privacy protection in the input image, and a privacy protection area generation unit 334 for generating a privacy protection area.

Here, the image adjustment unit 332 may adjust at least one of an image size and an image location so that the image signal matches the image generated based on the second input beam. This function may also be performed by the lens control unit 322 of the image signal generation module 320 illustrated in FIG. 5.

Furthermore, in the privacy protection method using the camera auxiliary device according to the embodiment of the present invention, the camera auxiliary device may convert the second input beam and transfer the converted second input beam to the camera at step S230 so that personal information contained in the privacy protection area is not visually identified.

For example, a conversion and transfer module 340 illustrated in FIG. 3 may include a transparent display or the like, which converts the second input beam and transfers the converted second input beam so that the privacy protection area can be selectively displayed from the second input beam received from the optical splitter module 310.

Here, the second input beam may be converted so that a portion of the second input beam, corresponding to the privacy protection area, is replaced with at least one of a masking image, a low-resolution image, and an image configured using an arbitrary object.

For example, as illustrated in FIG. 1, a facial portion of a person determined to be the privacy protection area in the capturing target may be replaced with at least one of a masking image 121, a low-resolution image 122, and an image 123 configured using an arbitrary object, and the converted image is reproduced and displayed, and thus the second input beam may be converted and transferred to the camera.

Here, the masking image may be an image processed not to be identifiable by encrypting or masking a portion corresponding to personal information. The low-resolution image may be an image, the quality of which is deteriorated to such an extent that the portion corresponding to the personal information is not visually identifiable by pixelating and blurring the corresponding portion. The image configured using the arbitrary object may be an image represented by replacing the portion corresponding to the personal information with an avatar or a component corresponding to the arbitrary object.

Figure 7:
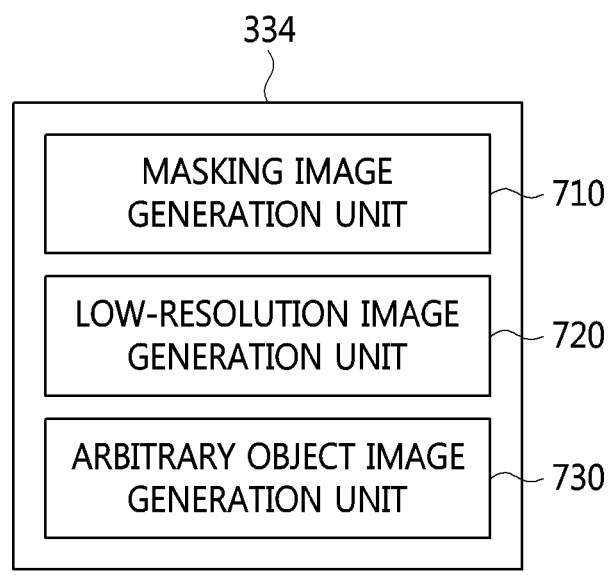
FIG. 7 is a block diagram illustrating in detail the conversion and transfer module illustrated in FIG. 3.

Here, the image used to convert the privacy protection area may be generated based on a masking image generation unit 710, a low-resolution image generation unit 720, and an arbitrary object image generation unit 730, which are included in the privacy protection area generation unit 334, as illustrated in FIG. 7.

For example, the masking image generation unit 710 may perform a function of generating a rectangular or circular masking image, which is capable of replacing a specific body region requiring privacy protection, such as a facial region or chest (or breast) region of the object. The low-resolution image generation unit 720 may generate an image having deteriorated visual quality using a pixilation or blurring function. The arbitrary object generation unit 730 may generate an image in which the component of the object (face, chest, or the like) corresponding to the privacy protection area is replaced with an arbitrary object, such as an avatar or a sticker, through an inference procedure based on artificial intelligence learning that has been previously performed.

Here, the masking image generation unit 710, the low-resolution image generation unit 720, and the arbitrary object image generation unit 730 may be simultaneously or separately operated.

Here, when the privacy protection area is replaced with the image configured using the arbitrary object, there is an advantage in that influence on various applications may be reduced compared to the case where the masking image or the low-resolution image is used. In other words, when an image captured using the camera of a user terminal is used for applications, such as somatometry or 3D avatar reconstruction, it may be preferable to replace the privacy protection area with an image configured using an arbitrary object rather than a masking image or a low-resolution image.

Also, although not illustrated in FIG. 2, the privacy protection method according to an embodiment of the present invention may store various types of information generated during the above-described privacy protection process in a separate storage module.

By utilizing the privacy protection method using the camera auxiliary device, personal information may be fundamentally protected so that the personal information is not transferred to a camera from a time point at which an image is captured by attaching a physical auxiliary device to the camera and capturing the image using the camera.

Further, there can be provided highly-reliable privacy protection technology that allows a user to personally check protected information by providing a camera auxiliary device for privacy protection, which is merely optically and physically connected, without being entirely connected to an external network, a camera, a mobile terminal, etc.

Furthermore, there can be provided privacy protection technology that reduces influence on various applications such as somatometry and three-dimensional (3D) avatar reconstruction, compared to existing privacy protection technology, when applying images captured by an external camera to the applications.

Figure 8:
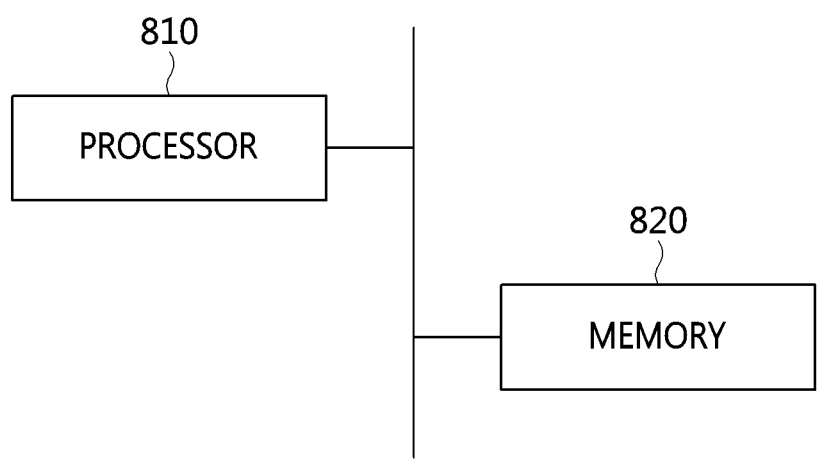
FIG. 8 is a block diagram illustrating a camera auxiliary device according to another embodiment of the present invention.

FIG. 8 is a block diagram illustrating a camera auxiliary device according to another embodiment of the present invention.

Referring to FIG. 8, the camera auxiliary device according to another embodiment of the present invention may include a processor 810 and memory 820.

The processor 810 splits an input light beam, which is reflected from a capturing target, into a first input beam for detecting a privacy protection area and a second input beam to be transferred to the camera.

Here, the camera auxiliary device may be physically attached to the external lens part of the camera without being connected to the user terminal, the camera, and the external network.

For example, referring to FIG. 3, a camera auxiliary device 300 according to an embodiment of the present invention may be operated, with the camera auxiliary device 300 being attached to an attachment unit 301 of a camera 302 provided on the user terminal.

Here, operations performed by the optical splitter module 310, the image signal generation module 320, the privacy protection area detection module 330, and the conversion and transfer module 340, which constitute the camera auxiliary device 300 illustrated in FIG. 3, may be performed by the processor 810 illustrated in FIG. 8.

The camera auxiliary device 300 attached to the camera 302 in this way may split an input light beam, which is reflected from a capturing target, into a first input beam and a second input beam based on an optical splitter module 310, which splits the input light beam into the first input beam and the second input beam.

For example, referring to FIG. 4, the optical splitter module 310 may split an input light beam 400, which is reflected from a capturing target, into at least one first input beam 410 and at least one second input beam 420 using a semitransparent mirror provided in the optical splitter module. In this way, the input light beam 400 is split into the first input beam 410 and the second input beam 420, thus enabling the image signal generation module 320 and the camera 302 illustrated in FIG. 3 to capture images at the time point synchronized with the image signal generation module 320 and the camera 302.

Further, the processor 810 detects a privacy protection area in the image signal generated based on the first input beam.

For example, referring to FIG. 3, the image signal generation module 320 may convert the first input beam, which is received from the optical splitter module 310, into an image signal, and may output the image signal.

Referring to FIG. 5, the image signal generation module 320 may include a lens unit 321, which focuses the first input beam received from the optical splitter module 310 on a sensor, a lens control unit 322 for controlling the focal point of the internal lens of the lens unit 321, the enlargement magnification of the lens unit, the vertical/horizontal deviations of the lens unit, etc., a sensor unit 323 for converting an optical signal corresponding to the first input beam into an electrical signal, an image control unit 324, and an image output unit 325 for converting the image signal into a signal suitable for external output, and outputting the converted signal.

Here, the first input beam may be transferred to the sensor of the sensor unit 323 based on an internal lens of the lens unit 321, and may then be converted into the electrical signal. The image control unit 324 may control at least one of the gain, brightness, contrast, color balance, definition, and sensor noise of the electrical signal corresponding to the image signal converted by the sensor unit 323.

Further, referring to FIG. 6, a privacy protection area detection module 330 may include an image input unit 331 for receiving an image signal from the image signal generation module 320 illustrated in FIG. 3, an image adjustment unit 332 for adjusting the image signal so that the image signal received from the image signal generation module 320 matches an image generated based on the second input beam, a privacy protection area detection unit 333 for detecting an area requiring privacy protection in the input image, and a privacy protection area generation unit 334 for generating a privacy protection area.

Here, the image adjustment unit 332 may adjust at least one of an image size and an image location so that the image signal matches the image generated based on the second input beam. This function may also be performed by the lens control unit 322 of the image signal generation module 320 illustrated in FIG. 5.

Furthermore, the processor 810 convert the second input beam and transfer the converted second input beam to the camera so that personal information contained in the privacy protection area is not visually identified.

For example, a conversion and transfer module 340 illustrated in FIG. 3 may include a transparent display or the like, which converts the second input beam and transfers the converted second input beam so that the privacy protection area can be selectively displayed from the second input beam received from the optical splitter module 310.

Here, the second input beam may be converted so that a portion of the second input beam, corresponding to the privacy protection area, is replaced with at least one of a masking image, a low-resolution image, and an image configured using an arbitrary object.

For example, as illustrated in FIG. 1, a facial portion of a person determined to be the privacy protection area in the capturing target may be replaced with at least one of a masking image 121, a low-resolution image 122, and an image 123 configured using an arbitrary object, and the converted image is reproduced and displayed, and thus the second input beam may be converted and transferred to the camera.

Here, the masking image may be an image processed not to be identifiable by encrypting or masking a portion corresponding to personal information. The low-resolution image may be an image, the quality of which is deteriorated to such an extent that the portion corresponding to the personal information is not visually identifiable by pixelating and blurring the corresponding portion. The image configured using the arbitrary object may be an image represented by replacing the portion corresponding to the personal information with an avatar or a component corresponding to the arbitrary object.

Here, the image used to convert the privacy protection area may be generated based on a masking image generation unit 710, a low-resolution image generation unit 720, and an arbitrary object image generation unit 730, which are included in the privacy protection area generation unit 334, as illustrated in FIG. 7.

For example, the masking image generation unit 710 may perform a function of generating a rectangular or circular masking image, which is capable of replacing a specific body region requiring privacy protection, such as a facial region or chest (or breast) region of the object. The low-resolution image generation unit 720 may generate an image having deteriorated visual quality using a pixilation or blurring function. The arbitrary object generation unit 730 may generate an image in which the component of the object (face, chest, or the like) corresponding to the privacy protection area is replaced with an arbitrary object, such as an avatar or a sticker, through an inference procedure based on artificial intelligence learning that has been previously performed.

Here, the masking image generation unit 710, the low-resolution image generation unit 720, and the arbitrary object image generation unit 730 may be simultaneously or separately operated.

Here, when the privacy protection area is replaced with the image configured using the arbitrary object, there is an advantage in that influence on various applications may be reduced compared to the case where the masking image or the low-resolution image is used. In other words, when an image captured using the camera of a user terminal is used for applications, such as somatometry or 3D avatar reconstruction, it may be preferable to replace the privacy protection area with an image configured using an arbitrary object rather than a masking image or a low-resolution image, thus deleting personal identification information and exerting no influence on somatometry or 3D avatar reconstruction (restoration of a 3D avatar).

The memory 820 stores the image signal and the privacy protection area.

Further, the memory 820 stores various types of information generated in the privacy protection process according to an embodiment of the present invention, as described above.

In an embodiment, the memory 820 may be configured separately of the camera auxiliary device to support functions for privacy protection. Here, the memory 820 may function as separate large-capacity (mass) storage, and may include a control function for performing the operation.

Meanwhile, the camera auxiliary device may be equipped with memory, and may internally store information in the device. In an embodiment, the memory may be a computer-readable storage medium. In an embodiment, the memory may be a volatile memory unit, and in another embodiment, the memory may be a nonvolatile memory unit. In an embodiment, a storage device may be a computer-readable storage medium. In various different embodiments, the storage device may include, for example, a hard disk device, an optical disk device or any other mass storage device.

By means of the above-described camera auxiliary device, personal information may be fundamentally protected so that the personal information is not transferred to a camera from a time point at which an image is captured by attaching a physical auxiliary device to the camera and capturing the image using the camera.

Further, there can be provided highly-reliable privacy protection technology that allows a user to personally check protected information by providing a camera auxiliary device for privacy protection, which is merely optically and physically connected, without being entirely connected to an external network, a camera, a mobile terminal, etc.

Furthermore, there can be provided privacy protection technology that reduces influence on various applications such as somatometry and three-dimensional (3D) avatar reconstruction, compared to existing privacy protection technology, when applying images captured by an external camera to the applications.

In accordance with the present invention, personal information may be fundamentally protected so that the personal information is not transferred to a camera from a time point at which an image is captured by attaching a physical auxiliary device to the camera and capturing the image using the camera.

Further, there present invention may provide highly-reliable privacy protection technology that allows a user to personally check protected information by providing a camera auxiliary device for privacy protection, which is merely optically and physically connected, without being entirely connected to an external network, a camera, a mobile terminal, etc.

Furthermore, the present invention may provide privacy protection technology that reduces influence on various applications such as somatometry and three-dimensional (3D) avatar construction, compared to existing privacy protection technology, when applying images captured by an external camera to the applications.

As described above, in the camera auxiliary device for privacy protection and the privacy protection method using the camera auxiliary device according to the present invention, the configurations and schemes in the above-described embodiments are not limitedly applied, and some or all of the above embodiments can be selectively combined and configured so that various modifications are possible.

What is claimed is:

1. A camera auxiliary device for privacy protection, comprising:

a processor for splitting an input light beam that is reflected from a capturing target into a first input beam for detecting a privacy protection area and a second input beam to be transferred to a camera connected to a user terminal, detecting a privacy protection area in an image signal generated based on the first input beam, and converting the second input beam and then transferring a converted second input beam to the camera so that personal information included in the privacy protection area is not visually identified; and a memory for storing the image signal and the privacy protection area.

2. The camera auxiliary device of claim 1, wherein the processor converts the second input beam so that a portion of the second input beam corresponding to the privacy protection area is replaced with at least one of a masking image, a low-resolution image, and an image configured using an arbitrary object.

3. The camera auxiliary device of claim 1, wherein the processor converts the first input beam into an electrical signal by transferring the first input beam to a sensor based on an internal lens, and generates the image signal by controlling at least one of a gain, brightness, contrast, color balance, definition, and sensor noise of the electrical signal.

4. The camera auxiliary device of claim 3, wherein the processor adjusts at least one of an image size and an image location so that the image signal matches an image generated based on the second input beam.

5. The camera auxiliary device of claim 2, wherein:
the masking image is an image that is processed not to be identifiable by encrypting or masking a portion corresponding to the personal information,
the low-resolution image is an image, a quality of which is deteriorated to such an extent that the image is not visually identifiable by pixelating and blurring the portion corresponding to the personal information, and
the image configured using the arbitrary object is an image represented by replacing the portion corresponding to personal information with an avatar or a component corresponding to the arbitrary object.

6. A privacy protection method using a camera auxiliary device, comprising:
splitting, by a camera auxiliary device for privacy protection, an input light beam that is reflected from a capturing target into a first input beam for detecting a privacy protection area and a second input beam to be transferred to a camera connected to a user terminal, wherein the camera auxiliary device is attached to an external lens part of the camera;

detecting, by the camera auxiliary device, the privacy protection area in an image signal generated based on the first input beam; and converting, by the camera auxiliary device, the second input beam and transferring a converted second input beam to the camera so that personal information included in the privacy protection area is not visually identified, wherein the camera auxiliary device is physically attached to the external lens part of the camera without being connected to the user terminal, the camera, and an external network.

7. The privacy protection method of claim 6, wherein transferring the converted second input beam comprises converting the second input beam so that a portion of the second input beam corresponding to the privacy protection area is replaced with at least one of a masking image, a low-resolution image, and an image configured using an arbitrary object.

8. The privacy protection method of claim 6, wherein detecting the privacy protection area comprises:
converting the first input beam into an electrical signal by transferring the first input beam to a sensor based on an internal lens; and
generating the image signal by controlling at least one of a gain, brightness, contrast, color balance, definition, and sensor noise of the electrical signal.

9. The privacy protection method of claim 8, wherein generating the image signal comprises adjusting at least one of an image size and an image location so that the image signal matches an image generated based on the second input beam.

10. The privacy protection method of claim 7, wherein:
the masking image is an image that is processed not to be identifiable by encrypting or masking a portion corresponding to the personal information,
the low-resolution image is an image, a quality of which is deteriorated to such an extent that the image is not visually identifiable by pixelating and blurring the portion corresponding to the personal information, and
the image configured using the arbitrary object is an image represented by replacing the portion corresponding to personal information with an avatar or a component corresponding to the arbitrary object.

* * * * *